United States Patent [19]

Essmann

[11] 3,899,839
[45] Aug. 19, 1975

[54] WRITING IMPLEMENT FOR PERSONS WITH GREATLY IMPAIRED OR LOST EYESIGHT

[76] Inventor: Carl J. Essmann, 82-38 235th St., Queens Village, N.Y. 11427

[22] Filed: June 20, 1974

[21] Appl. No.: 481,135

[52] U.S. Cl. .................................................. 35/38
[51] Int. Cl.² ....................................... G09B 21/00
[58] Field of Search ............ 35/38, 37, 36; 33/76 R, 33/80, 81

[56] References Cited
UNITED STATES PATENTS

| 553,504 | 1/1896 | Bennett | 35/38 UX |
| 2,562,479 | 7/1951 | Spikes | 35/38 X |
| 3,713,230 | 1/1973 | Essmann | 35/38 |

*Primary Examiner*—Wm. H. Grieb
*Attorney, Agent, or Firm*—J. B. Felshin; Marvin Feldman

[57] ABSTRACT

A writing implement for use by a person who has partial or no vision wherein a guide permits such person to form letter characters in a straight line for better legibility for a reader.

21 Claims, 7 Drawing Figures 3,899,839

WRITING IMPLEMENT FOR PERSONS WITH GREATLY IMPAIRED OR LOST EYESIGHT

This invention relates to a writing implement to said persons with greatly impaired or lost eyesight. More specifically this invention relates to a writing implement to aid persons with impaired vision so as to permit such persons to write in a readily legible manner.

This present invention is an improvement of my invention described in U.S. Pat. No. 3,713,230 granted Jan. 30, 1973.

In the prior art device, a blind person writes in a guide slot of fixed dimensions. While the aforesaid user was able to write within the slot such writing was often difficult to read. Such difficulty was occasioned by the fact that while certain letters particularly lower case letters had depending segments such as by way of example "g," "p," "q" and the like, other letters had upending segments such as by way of example, "d," "b," "k," and the like. The blind person writing within the fixed slotted guide found that it was extremely difficult to maintain the lower case letters with upending segments and those with depending segments in a straight, readily legible, line.

Now therefore there is provided by this invention an improvement to the aforesaid device whereby the user is rendered capable of writing in a more readily legible manner.

It is an object of this invention to provide an implement which permits a person with impaired vision to write letter characters in an even, legible manner.

It is another object of this invention to provide an implement as aforesaid which does not necessitate any peculiar dexterity on the part of such person and which can readily be manipulated without distorting the natural hand writing characteristics of such person.

It is a further object of this invention to provide an implement as aforesaid in which there is further provided means for affording the equal spacing of lines along which the aforesaid user is able to write.

It is still a further object of this invention to provide an implement having guide means to permit a person with impaired or lost vision to write letter characters having either upending or depending segments, in a straight line manner, so that the words formed by such characters are more readily legible.

The aforesaid as well as the other objects and advantages as will be apparent from a reading of the following detailed description and adjoined claims and the accompanying drawings, in which:

Figure 1:
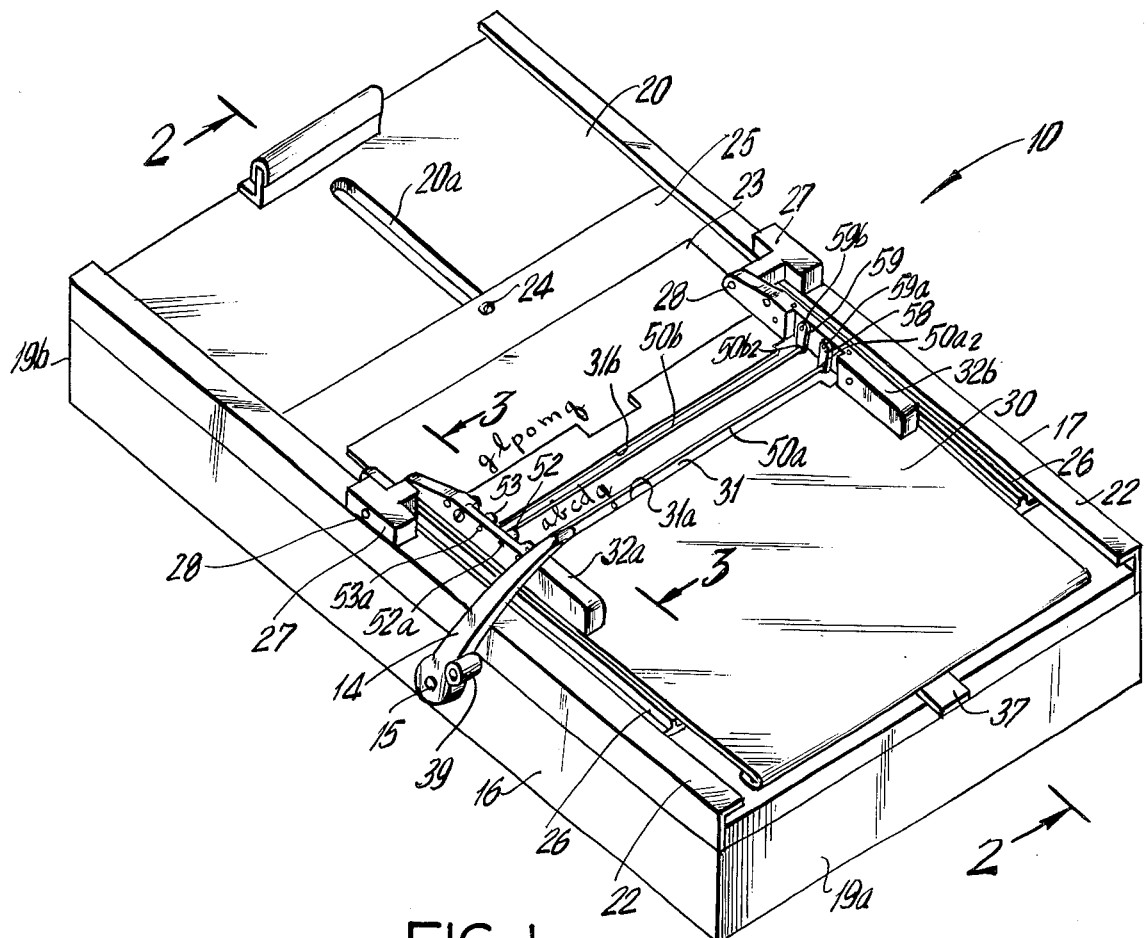
FIG. 1 is a perspective top view of the device embodying the invention.

Referring now specifically to FIGS. 1–5, there is shown the writing implement 10 pursuant to the invention, the metal housing of which is generally rectangularly shaped and is substantially without a bottom portion to afford access to certain operable parts of this implement. These parts comprise a toothed rack 11, a ratchet 12 with abutment 13, a shaft 15 connected with an actuator lever 14 disposed at the outer surface of longitudinal side wall 16, or alternatively at the outer surface of parallel opposed side wall 17, the operation of which will be more fully described hereinafter. If the person is left-handed it will be well understood, that lever 14 may be arranged on the right hand side wall surface 17 of the device, for which purpose shaft 15 can be prolonged to pass also through said side wall 17. Suitable openings (not shown) may be provided to arrange the stationary abutment 39 at said wall 17 without changing the remainder of the advance transmission mechanism as shown and after described with respect to FIG. 5.

Implement 10 further comprises opposed end walls 19a and 19b respectively and a top wall 20. Top wall 20 carries and slidably retains platform 25 and writing paper 23 in parallel opposed longitudinal frame pieces 22; each of said frame pieces 22 being mounted on one of said side walls 16 and 17, respectively. The writing paper is held in position by means of two parallel side rails 26. Each of said side rails 26 engages one of said frame pieces for guiding platform 25. Rack 11 is connected to platform 25 by screw 24.

Fixed on the frame pieces 22 is a pair of holders 27 with pivotable arms 32a and 32b carrying a swingable cover guide plate 30 which is pivoted at 28. Cover guide plate 30 is provided with a transversely disposed writing guide slot 31. The end of cover plate 30 has a handle grip 37 to facilitate swinging said plate about pivots 28.

Figure 5:
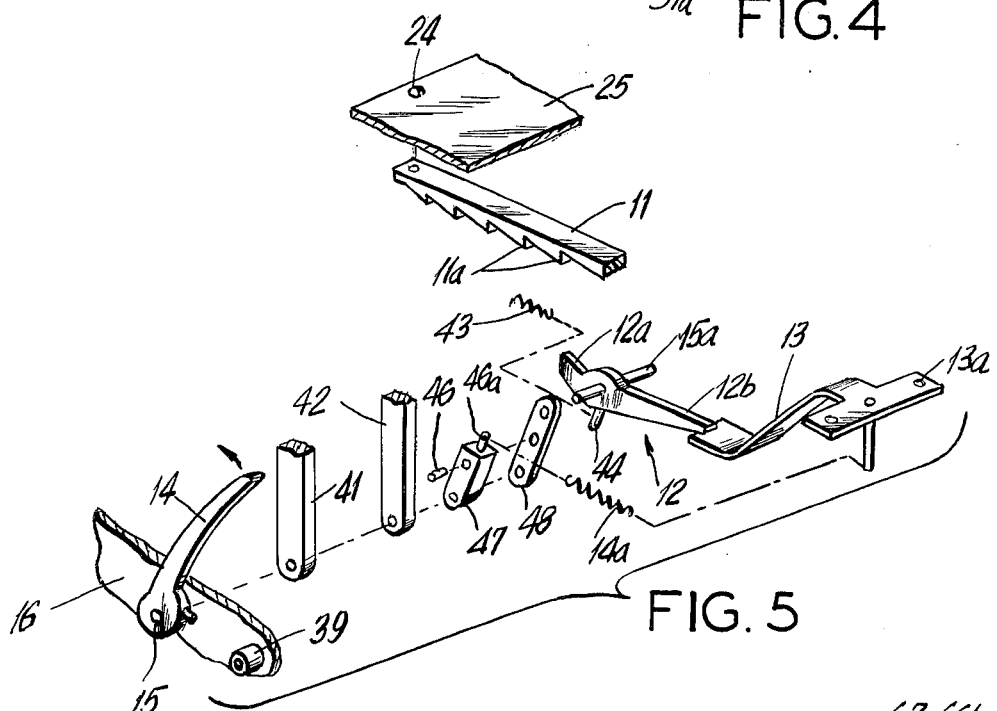
FIG. 5 is an exploded schematic view of the writing sheet advance mechanism shown in perspective.

On the outer side wall surface 16 of the implement 10 there is disposed an actuator lever 14, as aforesaid, which is spring-supported at 14a, so that lever 14 when moved together with shaft 15 in the direction of the arrow in FIG. 5 swings from abutment 39. Shaft 15 is rotatably supported by posts 41, 42, while ratchet 12 is normally held by means of the action of spring 43, pin 44 and further by retraction spring 14a in a position in which the end 12b comes to rest on abutment 13, while the forward effective end 12a normally just clears the toothed rack 11. Ratchet 12 is pivoted on a pin 15a which extends between two levers 47, 48 fixed on shaft 15 and movable together with the latter upon swing movement of actuator 14.

Abutment 13 in the form of a lever is attached to the underface at 13a of the top plate 20 through which extends the longitudinal slot 20a, in which is slidable rack 11 which is joined to the underface of platform 25. The teeth 11a of said rack cooperate with ratchet tooth 12a upon swinging movement of actuator 14 together with shaft 15, as above mentioned.

In the operation of the aforementioned transmission means, lever parts 47, 48 are swingable together via shaft 15 about journal posts 41, 42 which are fixed to underface of top plate 20 (not shown). Pin 15a is a pivot of pawl 12 which swings together with levers 47, 48 as the same are coupled together by pin 46 in predetermined position.

A strong retraction spring 14a acts normally at 46a on shaft 15 and actuator 14 so that the latter will be located against fixed abutment 39 while levers 47, 48 under the spring action cause pawl 12 to swing about pin 15a, thereby to keep tooth 12a of pawl 12 normally in out-of-engagement position with any of the teeth 11a of rack 11. During such action coil spring 43 will be compressed.

The movement of actuator lever 14 advances the platform 25 after the user has written within writing guide slot 31 and more particularly between writing guide bars 50a and 50b, as will be fully explained hereinafter. When platform 25 reaches its uppermost position the paper sheet 23 will be removed from platform 25, so that the same may then be slidably moved to its lower-most or starting position. Cover plate 30 may be swung 180° about pivots 28, so that the next sheet of paper may be securely placed between guide rails 26 and be retained therebetween. Cover plate 30 is then fully back to its initial position as seen in FIG. 1 in full lines.

Figure 2:
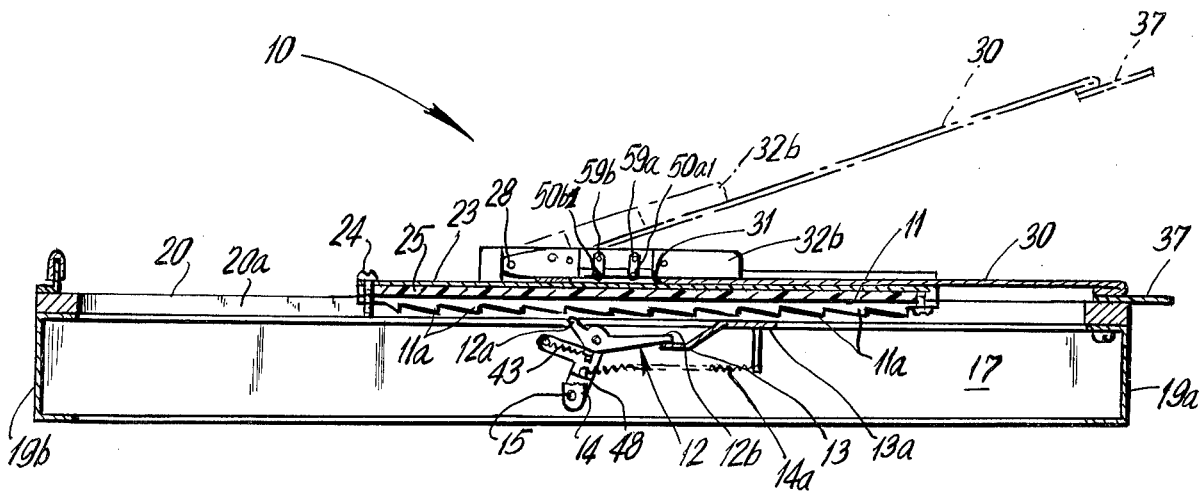
FIG. 2 is a sectional view taken along line 2—2 of FIG. 1.
Figure 3:
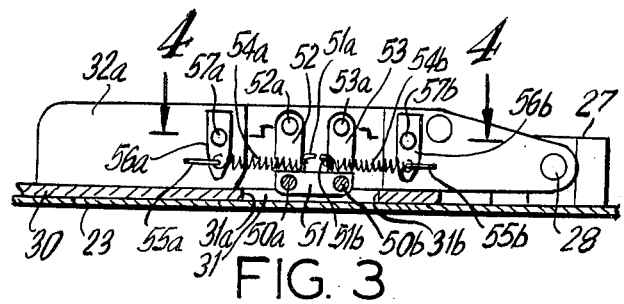
FIG. 3 is an enlarged partial sectional view taken along line 3—3 of FIG. 1.
Figure 4:
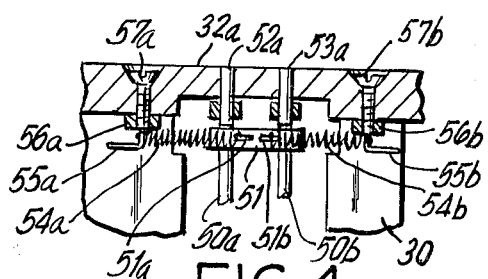
FIG. 4 is a partial sectional view taken along line 4—4 of FIG. 3.

Referring now to FIGS. 1–4, and more specifically to FIGS. 3 and 4, there is described in detail hereinbelow features of an embodiment of the present invention.

Guide bars 50a and 50b are in spaced parallel disposition and are disposed within writing guide slot 31 between lower and upper slot edges 31a and 31b, respectively. The distance between the guide bars 50a, 50b is sufficient for the insertion of the marking end of a hand-writing instrument, such as by way of example, fountain pen, ball point pen, pencil, marker, and the like, and preferrably of about one-fourth inch in spacing.

One pair of ends 50a1 and 50b1 of guide bars 50a, 50b, respectively is fixedly mounted to retaining member 51, so that the guide bars are maintained in a fixed space relationship. The said pair of guide bar ends extends through retainer 51 and said ends 50a1 50b1 are in turn fixedly mounted to the bottom end of depending members 52 and 53, respectively. The top ends of depending members 52, 53 are pivotally mounted to arm 32a by pivots 52a and 53a, respectfully, so as to permit members 52 and 53 to pivotally move and in turn cause retainer member 51, and guide bars 50a, 50b to move upwardly and downwardly within slot 31, and to and away from slot edges 31a, 31b. Slot 31 is preferably about eleven-sixteenths inch in width.

Retainer 51 has a pair of vertically disposed angled wires 51a and 51b, mounted at the top thereof. Each angled wire 51a, 51b is connected to one end of each of two springs 54a and 54b, respectively. The other respective ends of said springs 54a, 54b are connected to horizontally disposed forwardly angled wire 55a and horizontally disposed, rearwardly angled wire 55b, respectively. Wires 55a and 55b are fixedly mounted to arm 56a and 56b, respectively. Arms 56a and 56b are each in turn adjustably connected to arm 32a by means of screws 57a and 57b, respectively. That is, the tension of each spring may be adjusted by unscrewing one each of adjustment screws 57a or 57b and rotating the respective member, 56a or 56b, so that wires 55a or 55b, respectively, are closer to or further away from retainer 51, thereby placing the respective spring in more or less tension as may be desired.

By the aforedescribed manner of construction, when a user is writing a letter character having a depending segment, such as a "g" or "q" (see FIG. 1) the handwriting instrument exerts pressure forwardly (i.e. toward edge 31a) on guide bar 50a, causing guide bar 50a to move toward edge 31a in forming the depending segment. As guide bar 50a moves as aforesaid, retainer 51 in turn moves forwardly, causing spring 54b to be in tension and concomitantly spring 54a to be in compression, and concomitantly cause members 52 and 53 to move forwardly. Insofar as guide bar 50b is in fixed relationship to guide bar 50a, in this particular embodiment, guide bar 50b will move in a manner similar to that of 50a, but in this particular example the writing instrument may not be engaging guide bar 50b. As the user completes the depending segment of the letter character, that is moves the writing instrument rearwardly (toward edge 31b), spring 54b begins to compress and spring 54a begins to be in tension until the guide bars return to their initial position with the completion of the depending letter character segment. The user can extend the depending letter segment only of course as far as forward edge 31a of guide slot 31, and in any event only as far as the guide bars will pivot before depending members 52 and 53 abut the cutout portion of arm 32a. Upon sensing the forward edge 31a, the user begins to complete the letter character, by moving the instrument rearwardly away from the forward edge. For those letter characters having upending segments such ab "b," "d" and the like, the hand-held writing instrument instead exerts pressure on guide bar 50b, and the aforesaid procedure is reversed. The user may, depending upon the sensitivity of touch, adjust the tension on the springs for better touch feedback.

To complete the aforesaid description reference is made to FIGS. 1 and 2, and specifically the mounting of the other ends of guide bars 50a and 50b to arm 32b. Ends 50a2 and 50b2 are fixed mounted within the lower end portions of depending members 58 and 59, respectively, while the upper end portions of 58 and 59 are pivotally connected to arm 32b by means of pivots 59a and 59b, respectively. Members 58 and 59 are disposed within the cut-out portion of arm 32b. In this manner, guide bar ends 50a2 and 50b2 move freely with the movement of guide bar ends 50a1 and 50b1 so as to permit smooth and efficacious operation.

Figure 6:
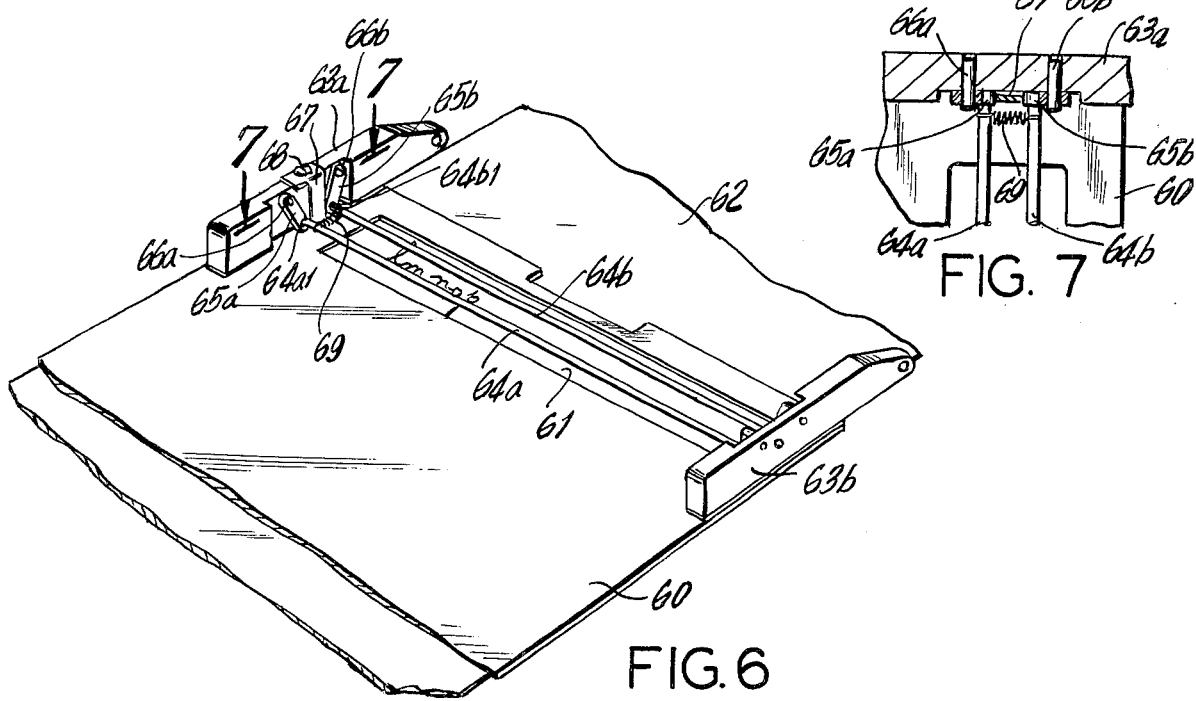
FIG. 6 is a top perspective view of an alternate embodiment of this invention.
Figure 7:
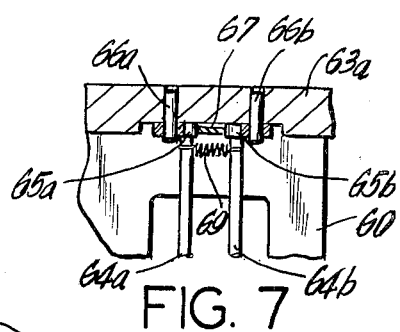
FIG. 7 is a partial sectional view taken along line 7—7 of FIG. 6.

Referring now specifically to FIGS. 6 and 7 there is shown an alternate embodiment of the present invention. This alternate embodiment of the invention comprises a guide plate 60 and having a guide slot 61, and arms 63a and 63b, overlaying a writing sheet 62, in a manner similar to that of the aforedescribed embodiment. Guide bars 64a and 64b are similar to guide bars 50a and 50b in construction. In the instant modification, ends 64a1 and 64b1 are fixedly mounted within depending members 65a and 65b, which members are in turn pivotally mounted at their respective upper ends to arm 63a by means of pivots 66a and 66b, respectively. A stop 67 is mounted to arm 63a by screw 68, and said stop 67 is disposed between depending members 65a and 65b to limit the movement of the members 65a, 65b toward each other, which in turn limits the minimum spaced distance between guide bars 64a and 64b. That distance is predetermined to be sufficient for the insertion of the end of a hand-held writing instrument. A spring 69 has ends interconnected to each of the guide bars 64a and 64b, respectively, and the guide bars are pivotally mounted to arm 63b in the manner similar to that previously described for arm 32b mounting.

A user in employing the immediately aforedescribed embodiment, when making a letter character having a depending segment, will exert pressure with the writing instrument on guide bar 64a causing this bar to move forwardly towards the most adjacent slot edge. As guide bar 64a moves, member 65b attempts to pivot with such movement, but member 65b under spring 69 force abuts stop 67, but the pivoting of member 65a is free to continue until the user, in forming the depending character segment, senses the adjacent edge of slot 61, and only until pivoting member 65a abuts arm 63a. In this movement of guide bar 64a, the guide bar spacing is increased and spring 69 is thereby placed in tension. As the pressure is relieved on guide bar 64a in completing the depending character segment, the tension on spring 69 lessens and the guide bar 64a retracted to its initial position. Of course the operation is similar for forming letter characters with upending segments, with pressure being exerted on guide bar 64b in contradistinction to guide bar 64a.

It is to be understood that the present invention is operable without the presence of the slot in the guide plate, as the movement of the guide bars is limited by stops on the arms. For example, in FIGS. 6 and 7 the movement of guide bar 64a is limited in the rearward direction by stop 67 and in the forward direction by cut-out portion of arm 63a, and the movement of guide bar 64b is limited in forward direction by stop 67 and in the rearward direction by cut-out portion of arm 63a. Also as to the embodiment of FIGS. 1–5, the movement of pivoting depending members 52 and 53 is limited by the cut-out portion of arm 32a (FIG. 4) and 32b (FIG. 2).

It is to be noted that in forming extending (i.e. upending or depending) segments of the letter characters the writing instrument remains in contact with the respective guide bar until completion of the extending segment, in both of the aforesaid embodiments.

It is within the contemplation of this invention to employ the slotted guide plate with the arms, guide bars and guide bar movement means, alone without the carrier and advance mechanisms. That is by overlaying the guide plate itself, as shown in FIG. 6, on a writing surface, a user may employ this invention to achieve the writing of a straight line of letters appearing between the guide bars (at rest position) and the depending segments and upending segments of the letter character extending from the lower (forward) and upper (rearward) guide bars, respectively, to the respective adjacent guide slot edge.

The preferred embodiments of the invention have been illustrated and described, but changes and modifications can be made and some features can be used in different combinations without departing from the invention as defined in the claims.

What is claimed is:

1. A writing implement for persons with partially or totally impaired eyesight comprising, a guide plate overlaying a writing surface and having a transversely disposed slot, a pair of spaced parallel guide bars disposed within said slot and transversely disposed to said plate, and wherein the bar spacing is sufficient for the insertion of a handwriting instrument therebetween, and means for retractably moving at least one of said guide bars toward a transverse edge of said slot upon exertion of the pressure of the handwriting instrument on said one of said guide bars, wherein said means for retractably moving one of said guides comprises means to retain said bars in fixed spaced relationship, means connected to the retainer means to permit movement of said retainer means, towards and away from the transverse slot edge, and spring means operatively connected to said retainer means so that both of said guides retractably move toward one of said transverse slot edges with exerted pressure of a handwriting instrument on one of said guides.

2. A writing instrument for persons with partially or totally impaired eyesight comprising, a guide plate overlaying a writing surface and having a transversely disposed slot, a pair of spaced parallel guide bars disposed within said slot and transversely disposed to said plate, and wherein the bar spacing is sufficient for the insertion of a handwriting instrument therebetween, and means for retractably moving at least one of said guide bars toward a transverse edge of said slot upon exertion of the pressure of the handwriting instrument on said one of said guide bars, further comprising a pair of spaced, parallel horizontal arms mounted to said plate one each of said arms being transversely disposed at respective ends of said guide bars, one of said arms comprising said means for retractably moving said guide bars, and the other of said arms comprising means for permitting movement of said guide bars.

3. The writing implement of claim 2, further comprising retainer means to retain said guide bars in fixed spaced relationship.

4. The writing implement of claim 3, wherein said means for retractably moving said guide bars comprises a pair of parallel spaced depending members, each of said members being pivotally dependingly connected at the top end to said one of said arms and connected at the lower end to one end of one of said guide bars, and a first spring, one end thereof being connected to the immediately aforesaid arm and the other end thereof being connected to said retaining means, and a second spring, one end thereof being connected to the immediately aforesaid arm and the other end thereof being connected to said retaining means.

5. The writing implement of claim 4, wherein the other arm comprising said means for permitting movement of said guide bar further comprises, a pair of parallel spaced depending members, each of said depending members being pivotally connected at the top end thereof to said other arm and at the lower end thereof to one other end of one of said guide bars.

6. The writing implement of claim 4, further comprising means to adjust the spring tension of said first spring and means to adjust the tension of said second spring.

7. The writing implement of claim 2, wherein said means for retractably moving said guide bars comprises a pair of parallel spaced depending members each of said depending members being pivotally connected at the top end thereof to one arm and connected at the lower end thereof to one end of one of said guide bars, stop means mounted to said arm and interposed between said depending members, and spring means operatively connected to and between said guide bars.

8. The writing implement of claim 7, wherein the other arm comprising said means for permitting movement of said guide bar further comprises a pair of parallel spaced depending members, each of said depending members being pivotally connected at the top end thereof to said other arm and at the lower end thereof to one other end of one of said guide bars.

9. A writing implement for persons with partially or totally impaired eyesight comprising in combination a carrier forming a housing provided with side walls and a top wall, said top wall having an upper surface, an underface and a longitudinal central slot through which extends a slidably toothed rack, movement transmission mechanism located below said top wall and including a ratchet operable to engage the teeth of said rack in predetermined succession and to move said rack, actuator means positioned for movement adjacent at least one of said side walls, a shaft supporting said actuator means and said ratchet and rotatably carried by the underface of said top wall, a paper supporting platform guided along the upper surface of said top wall, and a cover guide plate hinged to said top wall and having a transversely disposed writing guide slot defining a writing area, said guide slot exposing to view said writing area of said toothed rack, a pair of spaced parallel guide bars disposed within said slot and transversely disposed to said plate, and wherein the bar spacing is sufficient for the insertion of a handwriting instrument therebetween and means for retractably moving at least one of said guide bars toward a transverse edge of said slot upon exertion of the pressure of the handwriting instrument on said one of said guides, and whereby said actuator means when moved transmits movement via said ratchet to slidably advance said platform relative to said slot of said cover guide plate, further comprising a pair of parallel horizontal arms mounted to said plate one each of said arms being transversely disposed at respective ends of said guide bars, one of said arms comprising said means for retractably moving said guide bars, and the other of said arms comprising means for permitting movement of said guide bars.

10. The writing implement of claim 9, further comprising retainer means to retain said guide bars in fixed spaced relationship.

11. The writing implement of claim 10, wherein said means for retractably moving said guide bars comprises a pair of parallel spaced depending members, each of said members being pivotally depending connected at the top end to one of said arms and connected at the lower end to one end of one of said guide bars, and a first spring, one end thereof being connected to the immediately aforesaid arm and the other end thereof being connected to said retaining means, and a second spring, one end thereof being connected to the immediately aforesaid arm and the other end thereof being connected to said retaining means.

12. The writing implement of claim 11, wherein the other arm comprising said means for permitting movement of said guide bar further comprises a pair of parallel spaced depending members, each of said depending members being pivotally connected at the top end thereof to said other arm and at the lower end thereof to one other end of one of said guide bars.

13. The writing implement of claim 11, further comprising means to adjust the spring tension of said first spring and means to adjust the tension of said second spring.

14. The writing implement of claim 9, wherein said means for retractably moving said guide bars comprises a pair of parallel spaced depending members, each of said depending members being pivotally connected at the top end thereof to one arm and connected at the lower end thereof to one end of one of said guide bars, stop means mounted to said arm and interposed between said depending members, and spring means operatively connected to and between said guide bars.

15. The writing implement of claim 14, wherein the other arm comprising said means for permitting movement of said guide bar further comprises a pair of parallel spaced depending members, each of said depending members being pivotally connected at the top end thereof to said other arm and at the lower end thereof to one other end of one of said guide bars.

16. The writing implement of claim 9, further comprising means to pivotally mount said arms to said carrier, whereby said cover guide is swung into position onto said platform.

17. The writing implement of claim 9, said actuating means being a swingable lever connected to said shaft without said housing, at least one of said side walls being provided with an opening in which said shaft is journalled and operatively connected with said transmission mechanism in order to facilitate predetermined paper advance movement of said platform relative to said cover means.

18. The writing implement of claim 9, including respective abutment means against which said actuator means may be moved to be stopped thereby, to determine the stroke of said ratchet relative to the teeth of said rack and to set the advance slide movement of said paper carrying platform along said top surface and relative to said guide slot of said cover guide plate.

19. A writing implement for persons with partially or totally impaired eyesight comprising, a guide plate overlaying and exposing a portion of a writing surface, a pair of spaced parallel guide bars disposed above said writing surface and transversely disposed to said guide plate, and wherein the bar spacing is sufficient for the insertion of a handwriting instrument therebetween, and means for retractably moving at least one of said guide bars in forming an extending segment of a letter character upon exertion of the pressure of the handwriting instrument on said one of said guide bars, wherein said means for retractably moving one of said guide bars comprises means to retain said bars in fixed spaced relationship, means connected to the retainer means to permit movement of said retainer means, with movement of one of said guide bars, and spring means operatively connected to said retainer means so that both of said guide bars retractably move with exerted pressure of a handwriting instrument on one of said guide bars.

20. A writing implement for persons with partially or totally impaired eyesight comprising, a guide plate overlaying and exposing a portion of a writing surface, a pair of spaced parallel guide bars disposed above said writing surface and transversely disposed to said guide plate, and wherein the bar spacing is sufficient for the insertion of a handwriting instrument therebetween, and means for retractably moving at least one of said guide bars in forming an extending segment of a letter character upon exertion of the pressure of the handwriting instrument on said one of said guide bars, further comprising a pair of spaced, parallel, horizontal arms mounted to said plate one each of said arms being transversely disposed at respective ends of said guide bars, one of said arms comprising said means for retractably moving said guide bars, and the other of said arms comprising means for permitting movement of said guide bars.

21. The writing implement of claim 20, wherein said means for retractably moving said guide bars comprises a pair of parallel spaced depending members, each of said depending members being pivotally connected at the top end thereof to one arm and connected at the lower end thereof to one end of one of said guide bars, stop means mounted to said arm and interposed between said depending members, and spring means operatively connected to and between said guide bars.

* * * * *